United States Patent [19]
Gehrking

[11] 4,040,014
[45] Aug. 2, 1977

[54] MODEM SHARING DEVICE

[75] Inventor: Arvin George Gehrking, New Brighton, Minn.

[73] Assignee: Sperry Rand Corporation, New York, N.Y.

[21] Appl. No.: 722,954

[22] Filed: Sept. 13, 1976

[51] Int. Cl.$^2$ .......................................... H04B 1/38
[52] U.S. Cl. .............................. 340/147 LP; 364/900
[58] Field of Search ........................... 179/2 C, 2 DP; 340/147 C, 147 CN, 147 CV, 147 LP, 152 T

[56] References Cited
U.S. PATENT DOCUMENTS

| | | | |
|---|---|---|---|
| 3,609,693 | 9/1971 | Ferroglio | 340/152 |
| 3,772,656 | 11/1973 | Serracchioli et al. | 340/172.5 |

*Primary Examiner*—George G. Stellar

*Attorney, Agent, or Firm*—Thomas J. Nikolai; Kenneth T. Grace; Marshall M. Truex

[57] ABSTRACT

An electronic module including a logical interlock for interconnecting two data sources to a modem whereby only one of the two data sources is allowed to transmit data at a time. First and second flip-flops and logic gates controlled thereby are provided such that the first data source to present a Request-to-Send (RTS) signal is awarded priority and thereby selected to receive a Clear-to-Send (CTS) signal from the modem. A subsequent RTS signal from the non-selected data source is ineffective in establishing communication with such non-selected data source since that source is blocked from receiving a CTS signal from the modem. A clock signal is effectively employed to ensure that simultaneously-generated RTS signals from the two data sources are only responded to by one of the two data sources.

5 Claims, 3 Drawing Figures

MODEM SHARING DEVICE

BACKGROUND OF THE INVENTION

This invention relates generally to digital data communications apparatus and more specifically to a device which may be interposed between two data transmitters/receivers and an associated modem so that the modem is effectively shared by the plural data sources. As used heein, the term "data source" may include such things as a digital computer, a line terminal, a terminal control unit, or, in fact, any digital device which operates on a request/acknowledge basis with an associated modem. The term "modem" is an acronym for modulator-demodulator and is a device which accepts input binary data signal patterns and produces a resultant data pattern which may be transmitted over a communications link, such as a voice grade transmission line, to a corresponding receiving modem which, in turn, functions to recreate the original data pattern.

A typical system in which the present invention may find application is shown in FIG. 1 of the Jablonski Pat. No. 3,525,077 assigned to the assignee of the present invention. In this system a plurality of line terminals (LT's) each have associated therewith a modem device. In large systems involving many line terminals, the cost of providing discrete modems for each can be unduly excessive. The present invention allows two LT's to share a common modem and because the cost of the invention is low compared to the cost of typical modems, significant savings can be realized.

Prior art schemes for usng fewer modems than the number of data sources employed in the system have involved complex and therefore costly multiplexing arrangements. Exemplifying such as approach is the invention described in the Norberg U.S. Pat. No. 3,485,953. In this prior art arrangement, means are provided for transmitting data from a central station to a plurality of remote stations via a single communications channel. Each remote station has its own control unit associated with it and each of the control units is intercoupled so that when an identifying code is transmitted, only one remote station control unit can respond to that code to the exclusion of the remaining control units. In the present invention, however, two remote stations (line terminals, computers, etc.) share a single control unit and modem thus reducing the complexity and attendant costs.

The Haglund Pat. No. 2,131,434 relates broadly to the present invention in that it describes a method of assigning a transmitting channel of a telegraph system jointly to two branch transmitting stations. Means are provided for alternating between the two stations so long as both have messages to transmit and to remain locked to a single station so long as only that station is transmitting. However, the Haglund device is electromechanical in nature and operates in a fashion substantially different from the modem sharing device of the present invention.

In accordance with the teachings of the present invention, a Modem Sharing Device (MSD) is provided to control the flow of data from two terminals on a single line to another station. The MSD includes first and second flip-flops respectively associated with data sources or terminals 1 and 2. An RTS signal from terminal 1 or terminal 2 is ANDed with a signal from the clear side of a flip-flop corresponding to the other terminal to produce an RTS signal which is transmitted to the associated modem. The modem responds to this RTS signal by returning a CTS response signal. However, before the CTS response signal is received from the modem, a positive-going clock signal is used to set the associated flip-flop to which the RTS signal has passed. When the MSD receives the CTS signal from its associated modem, it is allowed to pass only through an AND gate associated with the set one of the two flip-flops. Thus, the CTS from the modem is only returned to one of the two associated terminals, depending upon which one caused the associated flip-flop to be set. One of the two flip-flops in the MSD is clocked by positive-going pulses from an oscillator while the other flip-flop is clocked by its subsequent negative-going edge. As such, a race condition is obviated in that the two flip-flops may not be simultaneously set.

OBJECTS

It is accordingly the primary object of the present invention to provide apparatus whereby two data terminals may share a single modem such that the two terminals may transmit or receive data non-simultaneously from a single communication channel.

Another object of the invention is to provide apparatus whereby two line terminals may be time shared with a single modem and communications channel on an alternating basis.

Still another object of the invention is to provide a modem sharing device which is implemented with digital logic in such a fashion that simultaneous requests for transmissions are handled in a manner that eliminates the possibility of race conditions.

Yet another object of the present invention is to provide an electronic interlock which will allow two sources to transmit data non-simultaneously to a single line, and which will resolve conflicts resulting from the two sources requesting transmission simultaneously, The foregoing and other objects, features and advantages of the invention will be apparent from the following more particular description of the preferred embodiment of the invention, as illustrated in the accompanying drawings.

DESCRIPTION OF THE PREFERRED EMBODIMEMT

Figure 1:
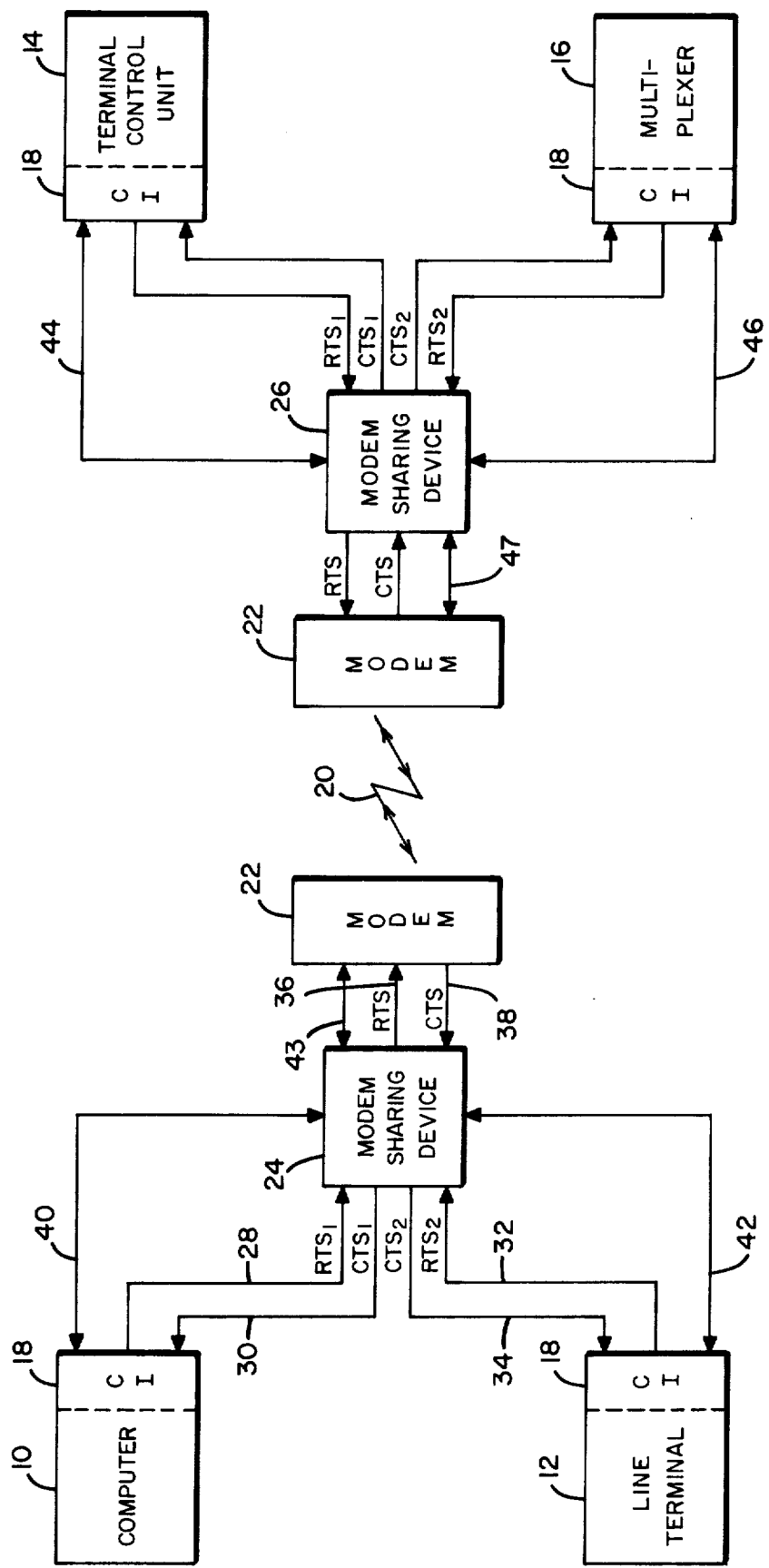
FIG. 1 is a system block diagram helpful in describing the environment in which the present invention finds application.

Referring now to FIG. 1, there is shown a block diagram of a transmission system in which the present invention finds application. A plurality of data sources (which also may be data receivers) are indicated by numerals 10, 12, 14 and 16. For example, data source 10 may be a general purpose digital computer, data source 12 may be a line terminal, source 14 is identified as a terminal control unit while source 16 is a multiplexer. These designations are, of coruse, somewhat arbitrary and are included to indicate the variety of terminal devices which may be employed in the system. Each of the sources 10, 12, 14 and 16 is provided with a communications interface (CI) 18 which serves to match the particular terminal to the remaining devices to ensure compatibility.

For purposes of illustration, the structure shown on the lefthand side of FIG. 1 may be considered as a transmitting station, while the structure shown on the right-hand side in FIG. 1 may be considered as a receiving station. However, it is to be understood that data may be transmitted bi-directionally over the communications channel 20. Disposed at either end of the transmitting channel 20 is a modem 22. A typical, commercially available modem suitable for use in the instant application is the Model 201 manufactured by Western Electric Company. At the transmitting end of the system there is disposed between the modem 22 and the pair of data sources 10 and 12 the modem sharing device (MSD) 24 of the present invention. Similarly, at the receiving site and MSD 26 is disposed between the receiving modem 22 and the data sources/receivers 14 and 16. As will become more fully apparent when the details of the construction of the MSD 26 and 26 are described. they are identical in form and may operate in either a transmitting or a receiving mode vis-a-vis its associated modem and data terminal.

As is shown in FIG. 1, the communications interface 18 associated with the terminal 10 is adapted to selectively send a Request-to-Send ($RTS_1$) signal to the MSD 24 by way of a control signal line 28 and to receive a Clear-to-Send ($CTS_1$) signal from the MSD 24 by way of a control line 30. Each of the communication devices 10, 12, 14 and 16 has a corresponding communications interface for transmitting and receiving the RTS and CTS signals. Specifically, terminal 12 has a communications interface 18 which is adapted to present an $RTS_2$ signal on control line 32 and to receive a $CTS_2$ signal by way of control line 34. The MSD 24 has corresponding signal lines linking it to its associated modem device 22. That is, the MSD 24 has an output line 36 adapted to transmit to the modem 22 an RTS signal. A control line 38 connected between the MSD 24 and the modem 22 is adapted to carry the CTS signal from the modem to the MSD 24. A bi-directional data link such as represented by line 40 is connected between the communications interface 18 and the MSD 24. It is over this bi-directional path that the actual data representing signals (as distinguished from the RTS and CTS control signals) are serially transmitted. Similarly, a line 42 connects the communications interface 18 associated with the line terminal 12 to the MSD 24 to allow serial data transmission therebetween. Line 43 couples device 24 to the modem 22 and is the bi-directional path over which data signals are serially transmitted.

An examination of FIG. 1 shows that identical connections are established between the MSD 26 and its associated modem 22 and between the MSD 26 and between the MSD 26 and its associated terminal unit 14 and 16. That is, the MSD 26 is adapted to receive or transmit RTS signals and CTS signals individually to and from the sources 14 and 16 and to pass an RTS signal to its associated modem 22 and receive a CTS signal therefrom. Again, lines 44 and 46 are provided to enable the bi-directional transmission of serial data signals between the terminals 14 and 16 and the receiving modem sharing device 26. Line 47 is the bi-directional serial data path for data signals.

Now that the system arrangement in which the present invention finds application has been described, consideration will be given to the details of the circuit used in implementing the MSD's 24 and 26 depicted in FIG. 1. This will be accomplished with reference to FIG. 2.

Figure 2:
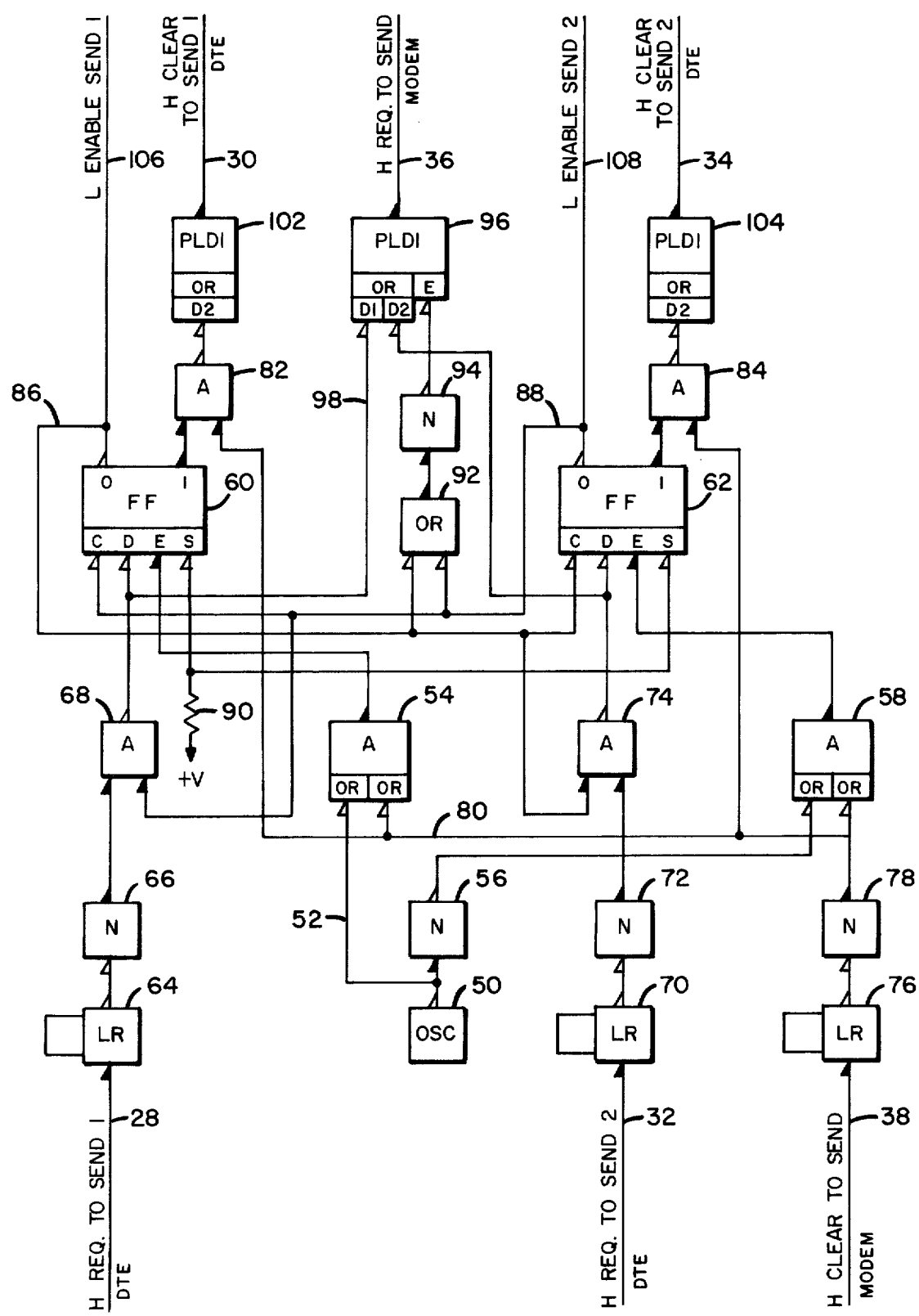
FIG. 2 illustrates by means of a logical block diagram the construction of the preferred embodiment.

As is shown in FIG. 2, there is provided a free-running square wave oscillator 50 which may, for example, be made to produce square wave pulses at a 1.28 MHz rate. The output from oscillator 50 is connected by a conductor 52 to a first input of a NOR gate 54. It is also applied by way of an inverter 56 to a first input of a separate NOR gate 58. The ouput from NOR gate 54 is connected to the enable input of a D-type flip-flop 60 and similarly, the output from NOR gate 58 is connected to the enable input of a D-type flip-flop 62.

As was indicated in connection with the description of the system arrangement of FIG. 1, the modem sharing device of the present invention is used to couple two line terminals such as 10 and 12 to a modem 22. The flip-flop 60 can be considered as being associated with a first data terminal and the flip-flop 62 may be considered as being associated with a second such terminal. Thus, an $RTS_1$ from the first terminal is applied by way of a conductor 28 from the data terminal 10 to the input of a line receiver circuit 64. The line receiver 64 is an amplifier stage which serves to match the signal level appearing on conductor 28 to the type of digital logic circuitry employed in implementing the MSD 24. The output from the line receiver 64 is inverted by circuit 66 and applied to a first input of NAND gate 68. In a similar fashion a control signal, $RTS_2$, from line terminal 12 is applied by way of conductor 32, line receiver amplifier 70, inverter 72 to a first input of NAND gate 74. The output from gates 68 and 74 are respectively connected to the data input terminals of the D-type flip-flops 60 and 62.

The CTS signal from the modem is applied by way of conductor 38, line receiver amplifier 76, and inverter 78 to the second input of the NOR gate 58, whose output is coupled to the enable input of the D-type flip-flop 62. The output from inverter 78 is also coupled to the second input of the NOR gate 54 whose output is coupled to the enable input of the flip-flop 60. The output from inverter 78 is also connected by a conductor 80 to a first input terminal of NAND gate 82 and to a first input terminal of a NAND gate 84.

The second inputs to the NAND gate 82 and 84 come, respectively, from the SET output terminals of the flip-flops 60 and 62. The CLEAR output terminal of the flip-flop 60 is coupled by a conductor 86 to the CLEAR input terminal of the flip-flop 62 and to a second input terminal of NAND gate 74. The CLEAR output terminal of the flip-flop 62 is coupled by a conductor 88 to the CLEAR input terminal of flip-flop 60 and to a second input of the NAND gate 68. The SET input terminals of both of the flip-flops 60 and 62 are connected through a resistor 90 to a source of positive potential $+V$.

The output signals from the Clear side of the flip-flops 60 and 62 are also applied as inputs to a NOR circuit 92 and the output of this circuit is applied by way of inverter 94 to the enable terminal of a line driver 96. The line driver 96 provides the RTS signal on line 36 to the modem 22 (FIG. 1). An RTS signal is sent to the modem on conductor 36 whenever the output from either NAND gate 68 or NAND gate 74 is a binary low condition by virtue of the fact that a connection is made between the outputs of these last mentioned NAND gates and the ORed inputs D1 and D2 of the line driver 96. Specifically, conductor 98 connects the output of NAND gate 68 to the input terminal D1 of line driver 96 and conductor 100 connects the output of NAND gate 74 to the input D2 of line driver 96.

The signal, $CTS_1$, from the MSD 24 to the communications interface 18 associated with data terminal 10 appears on the conductor 30. This conductor is connected to the output of line driver 102. A $CTS_1$ signal will be impressed on the conductor 30, provided the line driver 102 is enabled and provided further that NAND gate 82 is outputting a binary low signal. In a similar fashion, the $CTS_2$ signal from the MSD 24 to the communications interface 18 associated with the line terminal 12 will appear on conductor 34 when the output from NAND gate 84 is a binary low signal.

The outputs from the CLEAR side of the flip-flops 60 and 62 which appear on conductors 106 and 108 are applied individually to two AND circuits (not shown) in the MSD along with the transmitted data signals from the associated terminal devices 10 and 12. Thus, when the flip-flop 60 is set, the AND gate associated with data terminal 1 will be enabled so that data signals may pass over the conductor 40 (FIG. 1) through the MSD 24 and by way of line 43 to the modem 22. Similarly, when the flip-flop 62 is set, a low signal appears on conductor 108 and this low signal serves to enable an AND gate (not shown) in the MSD 24 so as to permit data representing signals to pass from the date terminal 12 over line 42, through the MSD 24 and line 43 to the modem 22.

OPERATION

Now that the details of the construction of the preferred embodiment have been described, consideration will be given to its mode of operation. In this regard, reference will be made to the timing diagram of FIG. 3.

Figure 3:
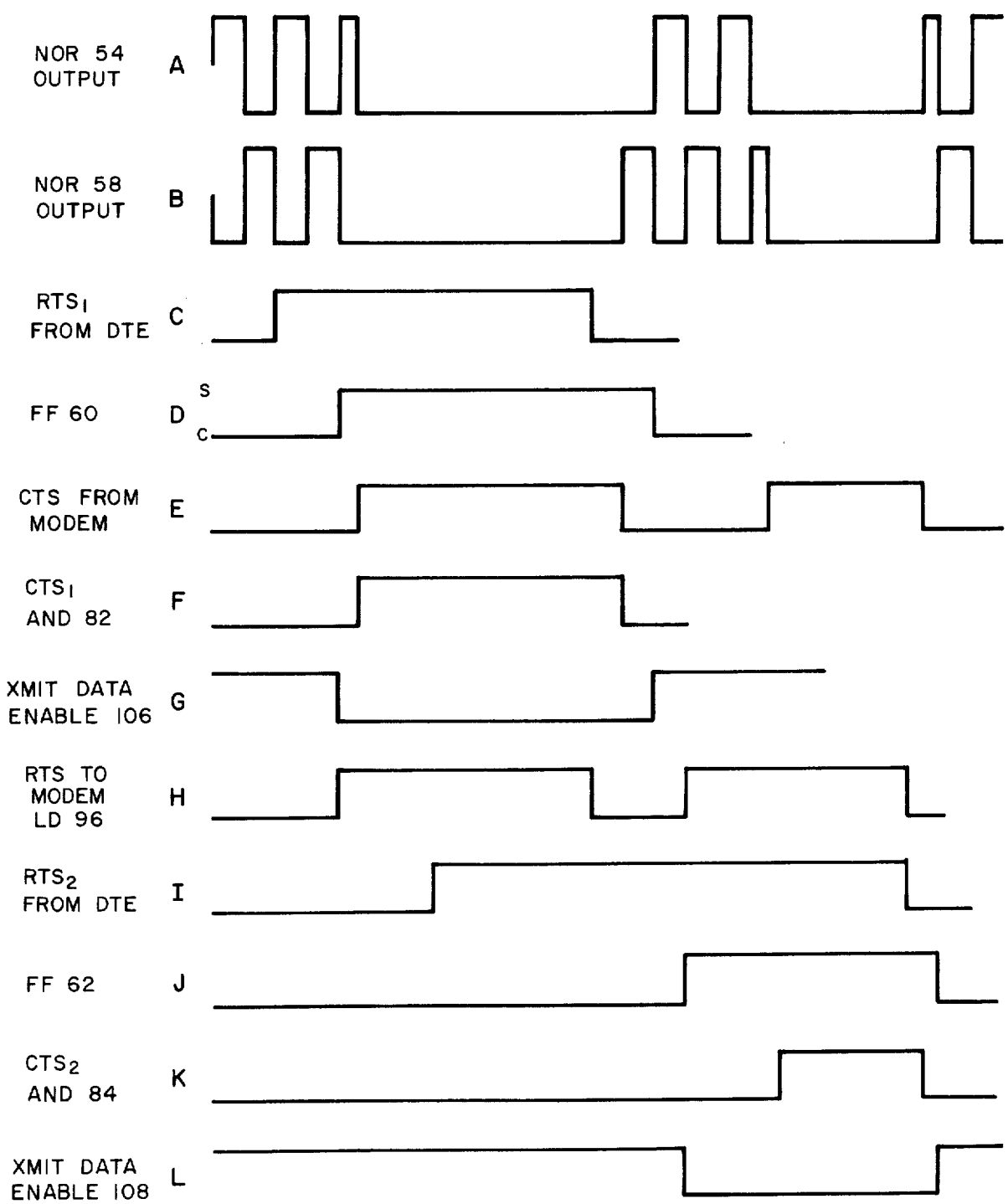
FIG. 3 illustrates by means of a series of waveforms the relative sequencing of the circuits illustrated in FIG. 2.

The free-running squarewave oscillator 50 produces squarewave pulses at a predetermined rate, for example 1.28 MHz, which are applied to a first input of NOR circuit 54. The waveform A in FIG. 3 represents the output from the NOR circuit 54. The output from the oscillator 50 is also inverted by circuit 56 and applied as a first input to a NOR gate 58. The waveform labeled B in FIG. 3 represents the output from the NOR gate 58. Thus, the oscillator 50 and its associated NOR circuits 54 and 58 are a means for producing a two-phase clock signal for controlling the sequencing of operation in the MSD.

The clocked electronic interlock of the present invention allows two line terminals, such as 10 and 12 in FIG. 1, to output data non-simultaneously to a single transmission line 20. This interlock prevents the two line terminals from performing data output simultaneously which would result in descruction of the data to be transmitted. Generally speaking, the first line terminal of the shared pair to sent an RTS signal will be allowed by the MSD interlock network to receive a CTS signal from the associated modem.

For the purpose of explaining the operation of the preferred embodiment, it is assumed that data terminal 10 sends an $RTS_1$ signal to the MSD 24 prior to the time that the line terminal 12 presents an $RTS_2$ signal to the MSD 24. In FIG. 3 this is illustrated by the waveforms C and I, respectively. When the data terminal 10 turns on the $RTS_1$ signal, it is applied by way of conductor 28 to the line receiver 64 in FIG. 2. The signal is amplified and shaped by this line receiver and applied by way of inverter 66 to a first input of NAND gate 68. Because at this time both of the flip-flops 60 amd 62 are cleared, the second input to the NAND gate 68 will be high (by virtue of the high signal on conductor 88) and gate 68 will be fully enabled to apply a low signal to the DATA (D) terminal of the D-type flip-flop 60. Hence, when the output from the NOR gate 54 goes positive for the first time following the enablement of gate 68, the flip-flop 60 will be set as illustrated by waveform D in FIG. 3.

The setting of the flip-flop 60 causes several events to take place. Firstly, the output from the Set side of the flip-flop 60 goes high to partially enable NAND gate 82, such that a CTS signal from the modem appearing on line 38 passes through the line receiver 76, the inverter 78 and, by way of conductor 80, fully enables the NAND gate 82. The resulting output from gate 82 is applied to an input of line driver 102 to cause a $CTS_1$ signal to appear on conductor 30. This signal is represented by waveform F in FIG. 3. The setting of the flip-flop 60 prevents any subsequent $RTS_2$ signal on conductor 32 from setting the flip-flop 62 by placing a continuous low signal on the Clear terminal thereof by way of conductor 86. Hence, NAND gate 84 is disabled and prevented from passing a $CTS_2$ signal to the line driver 104. The setting of the flip-flop 60 causes a low signal to appear on conductor 106 connected to its Clear side. This low signal (waveform G in FIG. 3) is applied to an AND gate (not shown) to enable that gate to pass serial data over conductor 40 (FIG. 1) and through the MSD 24 to the modem 22 by way of conductor 43. Finally, when the flip-flop 60 is set, the low signal appearing on conductor 86 passes through OR circuit 92 and inverter 94 to enable the line driver 96. With line driver 96 enabled, the $RTS_1$ signal from the data terminal 10 (FIG. 1) passes through line receiver 64, inverter 66, NAND gate 68 and by way of conductor 98 through the line driver 96 to form the RTS signal on conductor 36 which goes to the modem 22. This signal is represented by waveform H in FIG. 3.

Once a $RTS_1$ signal from the data terminal 10 is honored by causing the flip-flop 60 to be set, a subsequent $RTS_2$ signal from the data terminal 12 has no effect. This is due to the fact that flip-flop 62 is blocked from being set by the low signal applied to its Clear input terminal by way of conductor 86. With flip-flop 62 in its Clear state, NAND gate 84 is disabled and prevents a $CTS_2$ signal from being developed on the conductor 34. Hence, the line terminal 12 will not be notified that it is permitted to transmit data. When the $RTS_1$ signal (waveform C in FIG. 3) turns off, NAND gate 68 is disabled and the signal on conductor 98 goes high, turning off the RTS signal on conductor 36 to the modem. After a predetermined delay, the modem responds by turning off its CTS signal (waveform E). It is to be noted that the flip-flop 60 will not be reset or cleared until a time subsequent to the time that the CTS signal from the modem turns off because clock pulses from the NOR gate 54 are blocked by the output from inverter 78 whenever the CTS signal from the modem is high. Shortly after the CTS signal from the modem applied to conductor 38 is turned off (goes low) the signal $CTS_1$ on conductor 30 goes off because of the absence of a suitable enable on the NAND gate 82. (See waveform F in FIG. 3.)

The first positive-going edge on a signal from NOR gate 54 (waveform A) following the time that the CTS turns off causes the flip-flop 60 to be cleared. (See waveform D in FIG. 3.) Once flip-flop 60 is cleared, flip-flop 62 is unlocked and since it is assumed that an $RTS_2$ signal had been waiting in the high state while $RTS_1$ had control (see waveform I), this $RTS_2$ signal would pass through the NAND gate 74 to effect a setting of the flip-flop 62 upon the occurrence of the first positive-going excursion of the clock signal from NOR gate 58 (waveform B). The setting of the flip-flop 62 causes flip-flop 60 to be locked out so that the flip-flop 60 would no longer be sensitive to $RTS_1$ signals until such time as the flip-flop 62 is again cleared. The setting of the flip-flop 62 also causes a low signal to appear on conductor 108 and it is this signal which enables the gate (not shown) through which data signals may pass by way of line 42 from the terminal 12 to the MSD 24. Also, the high output from the set side of the flip-flop 62 enables NAND gate 84 so that a CTS signal from the modem appearing on conductor 38 may pass through the line driver 104 to form the $CTS_2$ signal which is fed back over control line 34 to the line terminal 12. The setting of the flip-flop 62 causes a low signal to appear on conductor 88 which passes through OR circuit 92 and inverter 94 to enable the line driver 96. The $RTS_2$ signal on conductor 32 may therefore pass by way of line receiver 70, inverter 72, NAND gate 74, conductor 100 and the line driver 96 to form the RTS signal which is delivered over line 36 to the modem.

When the line terminal 12 turns off its $RTS_2$ signal, the RTS signal on conductor 36 turns off and, after a predetermind delay, the modem 22 responds by turning off its CTS signal. Once the CTS signal from the modem goes low, the $CTS_2$ signal on conductor 34 also goes low because NAND gate 84 is no longer satisifed. Now, the first positive-going excursion of a clock signal from NOR gate 58 following the removal of the CTS signal from the modem will cause the flip-flop 62 to be cleared. Again, if at this time the $RTS_1$ signal was present, the cycle of operation would again be repeated.

It is to be noted that the clock signal is generated by oscillator 50 which is a discrete component oscillator, preferably crystal controlled. The oscillator output provides for two-phase clocking by way of its leading and lagging edges. In the embodiment of the present invention, only positive-going edges are used for setting and clearing the two flip-flops 60 and 62. Therefore, by inverting the clock output by inverter 56, alternate positive-going edges are generated such that a positive leading edge is applied to only one of the two flip-flops at a time. This prevents race conditions, i.e., the simultaneous setting of the two flip-flops. Thus, if it should happen that both terminals 10 and 12 turn on their respective $RTS_1$ and $RTS_2$ signals simultaneously, only one will be honored. Which one is honored will be entirely dependent on when the RTS signals turn on with respect to the clock signal. Thus, simultaneous $RTS_1$ and $RTS_2$ signals each have a fifty percent chance of being honored. These "simultaneous" signals could turn on as much as 391 nanoseconds from each other and still be interpreted as "simultaneous."

Thus, it can be seen that there is provided by this invention an electronic interlock which permits two data sources to transmit data non-simultaneously to a single communications line and which will resolve conflicts resulting from the two sources requesting transmission simultaneously. It is to be understood that while the detail drawings and specific examples given describe the preferred embodiment of the invention, they are for purposes of illustration only, the apparatus of the invention is not limited to the precise details and conditions disclosed and that various changes may be made therein without departing from the spirit of the invention which is defined by the following claims.

What is claimed is:

1. In a communications system of the type including a plurality of line terminals for transmitting and receiving data to and from modem units, said line terminals and modems operating in response to Request-to-Send and Clear-to-Send commands, apparatus for sharing a single modem unit between plural line terminals comprising:
    a. a plurality of flip-flops individually associated with each of said line terminals;
    b. timing means responsive to a Request-to-Send signal from said line terminals for setting only one of said plurality of flip-flops at a time;
    c. means connecting the outputs of a given one of said plurality of flip-flops to the inputs of the remaining flip-flops such that so long as said given one of said plurality of flip-flops is set, the remaining flip-flops are prevented from being set;
    d. means connected to the outputs of said plurality of flip-flops for transmitting said Request-to-Send signal to said single modem; and
    e. means connected to said plurality of flip-flops for transmitting a Clear-to-Send signal from said single modem to only that line terminal associated with the set one of said plurality of flip-flops.

2. Apparatus as in claim 1 and further including means for enabling the transmission of data between said single modem and only that line terminal associated with the set one of said plurality of flip-flops.

3. Apparatus as in claim 1 wherein said flip-flops are D-type flip-flops.

4. Apparatus as in claim 3 wherein said timing means comprises:
    a. a multiphase source of regularly occurring clock signals; and
    b. means connecting the individual phases of said multiphase clock source individually to the enable input of said D-type flip-flops.

5. In a communication system of the type including first and second line terminals for transmitting and receiving data to and from modem units, said line terminals and modems operating in response to Request-to-Send and Clear-to-Send commands, a modem sharing device disposed between a modem and said first and second line terminals, comprising in combination:
    a. a source of regularly occurring clock signals;
    b. a first bistable circuit coupled to said source and which is set by the first leading edge of a clock signal from said source following receipt of a Request-to-Send command from said first line terminal;
    c. a second bistable circuit coupled to said source and which is set by the first leading edge of a clock signal from said source following the receipt of a Request-to-Send command from said second line terminal;
    d. a first coincidence gate connected to said first bistable circuit for permitting transmission of a Clear-to-Send command from said modem to said first line terminal when said first bistable circuit is set;
    e. a second coincidence gate connected to said second bistable circuit for permitting transmission of a Clear-to-Send command from said modem to said second line terminal when said second bistable circuit is set; and
    d. interlock means connecting said first and second bistable cicuits for permitting only one of said first or second bistable circuits to be set at any given time.

* * * * *